United States Patent Office 2,704,258
Patented Mar. 15, 1955

2,704,258

METHOD OF MAKING A DRY AND WET SALAD DRESSING

Earl P. Haney, Winchester, Mass.

No Drawing. Application November 3, 1950,
Serial No. 194,041

2 Claims. (Cl. 99—144)

The present invention relates to a salad dressing of the type which has a low caloric value per weight and further has no oils and practically no fat so that it may readily be used by people who are either on a reducing diet or wish to avoid rich foods.

The invention however has other utilities, principally in providing a dry mixture which may readily be converted into a salad dressing thereby decreasing the necessary weight and bulk of shipping containers and further making it possible to store the mixture under ordinary conditions without fear of the mixture decomposing or changing its characteristics.

The product is however rich in vitamins and milk proteins and may be used in various forms, not only as a salad dressing when mixed as will be indicated below with water and vinegar, but also in its dry form for use in cooking or seasoning with vegetables and fruits, both raw and cooked.

The powder of the present invention need not be shipped in glass jars, but can be shipped in cans or air tight packages or containers, thus eliminating weight and breakage.

In its dry form the product comprises an edible mixture in which powdered skimmed milk, powdered whole milk, powdered casein or a mixture of the same is used in the ratio of approximately four times that of dextrin. To this mixture may be added seasoning such as salt, sugar, with very small quantities of spices and other seasoning which may include pepper, garlic, ferula, foetida, asafetida or other species of the same substances. Finely powdered mustard, such as black, yellow, white or mixtures of the same may also be added together with turmeric in a fine powdered form.

A typical formula of the dry salad powder is set forth below:

|   | Parts |
|---|---|
| Pure table salt | 100–200 |
| Finely powdered mustard, black, yellow, white or mixtures of the same | 75–150 |
| Granulated cane or beet sugar | 50–250 |
| Turmeric in fine powdered form | 1½ |
| Ferula, foetida, *Ferula glabanifula* or other species of Ferula or asafetida | ½ |
| Powdered whole milk, powdered skimmed milk or powdered casein or combinations thereof | 1700–2000 |
| Dextrin in powder form (white preferred) | 400–550 |

These substances should be thoroughly mixed and ground together and when sold should be packed in air-tight moisture-proof packages or containers.

Where it is desired to make up a salad dressing having the consistency of mayonnaise dressing, the following further directions should be followed:

Accurately measure and mix together water and vinegar in the ratio of 5–1. The water should be warm and with the amounts of the dry powder as set forth above, approximately 2500 parts by weight would use up practically the amounts as given in the formula above with 456 parts vinegar.

Place the water and vinegar (white vinegar is preferred) in a mixing bowl and gradually add the powdered mixture while beating or whipping the water and vinegar.

If the powder is added gradually the resulting viscous dressing will be very smooth and free from lumps.

After the mixture has been made and thoroughly whipped up it should be permitted to stand in an open container for an hour or more, when it may be used. A larger proportion of vinegar to water may be used in the ratio of 3–4 or 2–5 with good results.

The flavor will become further developed if permitted to stand for twenty-four hours or more. In its mixed form with water and vinegar, it will tend to maintain its qualities but should however be kept under refrigeration.

The above formula has been given for producing a salad dressing having the ordinary consistency of mayonnaise under normal to slightly cool temperatures. If a thicker dressing is desired, less water and correspondingly less vinegar may be used or less water with the same amount of vinegar may be used.

In this formula the dextrin acts to retard the precipitation of the casein from the milk when the vinegar is added, thus producing a more homogeneous product with a solvent media for milk sugar and calcium salts approaching that of a natural milk in that the proportion of carbohydrates to the proteins is increased by the minimum amount of dextrin.

The ferula, foetida, *ferula glabanifula*, or other substances of ferula or asafetida is an excellent condiment and furnishes an onion or garlic tang, but further serves as a stabilizer and a fixative for other spices retarding also bacterial activity adding to the keeping qualities of this product.

It is desirable that the dextrin in the above formula be substantially soluble in water and this is true of most commercial dextrin. Dextrin having any substantial portion which is insoluble containing $\beta$-dextrin should be avoided.

Having now described my invention, I claim:

1. A method of making a salad dressing which first comprises making a dry powdered mixture of dextrin and powdered milk in approximately the ratio of 1 to 4 with an amount equal substantially to that of the dextrin, of sugar, salt, and other seasonings taken together, making an intimate mixture of warm water and vinegar in a ratio of not more than 5 to 1 and then adding sufficient of the powdered mixture while beating the water and vinegar until the desired consistency of viscosity of the salad dressing is obtained.

2. A method of making a salad dressing which comprises taking the dry mixture comprising:

|   | Parts |
|---|---|
| Dextrin in powdered form | 400–550 |
| Powdered milk, skimmed or whole | 1700–2000 |
| Table salt, mustard and sugar forming | 400–500 |
| Turmeric in fine powdered form approximately and Ferula, foetida, *Ferula glabanifula* or other species of Ferula or asafetida | 1½ ½ | mixing together 2200 parts of warm water approximately with 450 parts of vinegar, then adding the mixture as set forth above gradually while vigorously beating the mixture of vinegar and water.

References Cited in the file of this patent

UNITED STATES PATENTS

| 1,354,563 | Jaeger et al. | Oct. 5, 1920 |
| 2,217,699 | Musher | Oct. 15, 1940 |

FOREIGN PATENTS

| 17,414 | Great Britain | 1899 |
| 1,823 | Australia | Aug. 3, 1926 |